United States Patent
Dencker et al.

(10) Patent No.: US 7,131,064 B2
(45) Date of Patent: Oct. 31, 2006

(54) XML CLIENT ABSTRACTION LAYER

(75) Inventors: Thorsten Dencker, Ludwigshafen (DE); Claudius Fischer, Schwetzingen (DE); Andreas Röessler, Sulzfeld (DE)

(73) Assignee: SAP AG, Walldorf (DE)

( * ) Notice: Subject to any disclaimer, the term of this patent is extended or adjusted under 35 U.S.C. 154(b) by 571 days.

(21) Appl. No.: 10/095,354

(22) Filed: Mar. 11, 2002

(65) Prior Publication Data

US 2003/0172344 A1    Sep. 11, 2003

(51) Int. Cl.
*G06F 15/00* (2006.01)

(52) U.S. Cl. ...................... 715/513; 715/514
(58) Field of Classification Search ............. 715/513, 715/514, 515, 516
See application file for complete search history.

(56) References Cited

U.S. PATENT DOCUMENTS

| | | | |
|---|---|---|---|
| 6,684,370 B1* | 1/2004 | Sikorsky et al. ............ 715/513 |
| 6,772,413 B1* | 8/2004 | Kuznetsov .................. 717/136 |
| 6,816,871 B1* | 11/2004 | Lee .......................... 707/104.1 |
| 2001/0049702 A1* | 12/2001 | Najmi ........................ 707/513 |
| 2001/0051879 A1* | 12/2001 | Johnson et al. ................ 705/2 |
| 2002/0049702 A1* | 4/2002 | Aizikowitz et al. ........... 707/1 |
| 2002/0078134 A1* | 6/2002 | Stone et al. ................. 709/202 |
| 2002/0143821 A1* | 10/2002 | Jakubowski ............... 707/522 |
| 2002/0156929 A1* | 10/2002 | Hekmatpour ............... 709/310 |
| 2003/0074342 A1* | 4/2003 | Curtis .......................... 707/1 |
| 2003/0105884 A1* | 6/2003 | Upton ........................ 709/318 |
| 2003/0140333 A1* | 7/2003 | Odaka et al. ............... 717/115 |
| 2003/0159111 A1* | 8/2003 | Fry ............................ 715/513 |
| 2004/0123302 A1* | 6/2004 | Lo et al. .................... 719/310 |

FOREIGN PATENT DOCUMENTS

DE    100 42 601 A    5/2001

OTHER PUBLICATIONS

Villard, Lionel, "Hypermedia and Graphics 2: Authoring Transformations by Direct Manipulation for Adaptable Multimedia Presentations", Proceedings of the 2001 ACM Symposium on Document Engineering, Nov. 2001, pp. 125-134.*

Fernandez, Mary, et al, "Declarative Specification of Web Sites with Strudel", The VLDB Journal—The International Journal on Very Large Data Bases, vol. 9, Issue 1, Mar. 2000, pp. 38-55.*

Emmerich, Wolfgang, et al, "TIGRA—An Architectural Style for Enterprise Application Integration", Proceedings of the 23rd International Conference on Software Engineering, Jul. 2001, pp. 567-576.*

* cited by examiner

*Primary Examiner*—William Bashore
*Assistant Examiner*—L. Ries
(74) *Attorney, Agent, or Firm*—Fish & Richardson P.C.

(57) ABSTRACT

An XML client abstraction layer for providing an XML page description as an abstraction of an HTML page at design time. A style sheet XSLT translator is used to derive the run time code from the XML page. Additional features or improvements may be added through an XML parser.

18 Claims, 3 Drawing Sheets

XML CLIENT ABSTRACTION LAYER

FIELD OF THE INVENTION

This invention relates to an XML-based client abstraction layer for enabling the design of web-based applications with reusable elements.

BACKGROUND OF THE INVENTION

Web-based application development may entail many different HTML pages. When designing such applications, it could be a tremendous investment of time and resources to separately code each page. This investment is wasteful, especially when many similar or identical elements appear in multiple pages.

Additionally, web developers who are developing HTML templates are not usually forced to use existing functions and design interfaces. Thus, several different templates could end up being developed to perform the same functions. Each of these templates may well be unique because different programmers program with their own unique styles. Because of this uniqueness, central design changes are not practical. Thus, not only are development costs high for such applications, support costs are also.

It would therefore be beneficial to develop a library of elements that are reusable in design time. A need exists for a framework for creating and using reusable elements in design time to generate HTML pages. This framework would preferably be runtime and device independent.

SUMMARY OF THE INVENTION

The present invention consists of using an XML page description as an abstraction of the HTML page at design time. This XML description is used to define layout information, rater than data, as it is usually used for. A style sheet XSLT translator is then used to derive the run time code from the XML page. By doing this, development can be standardized. Normally, HTML programmers tend to use their own special programming techniques to develop code. By using the abstraction layer, you can bypass this step and enhance the maintainability of the code.

Additionally, by using the XML client abstraction layer, other features can be mixed into the generated HTML page without actually changing the templates. Instead, the insertion or improvement of features can be done in the abstraction layer through an XML parser.

The technique of the present invention is usable with both new technologies and existing technologies.

An embodiment of the present invention provides a framework for creating and using a library of reusable elements in design time to generate HTML pages.

Another embodiment of the present invention provides a framework for permitting central HTML template changes to web based applications.

As such, it is an object of the present invention to facilitate the creation and use in design time of a library of reusable elements to generate HTML pages.

It is a further object of the present invention to facilitate central HTML template changes to web-based applications.

DESCRIPTION OF THE PREFERRED EMBODIMENTS

The present invention will be better understood by reference to the accompanying drawings. The use of the term "layer" herein is a reference to a grouping based upon function. The grouping may or may not be physically dependent on another layer(s) for interfacing with other layers.

Figure 1:
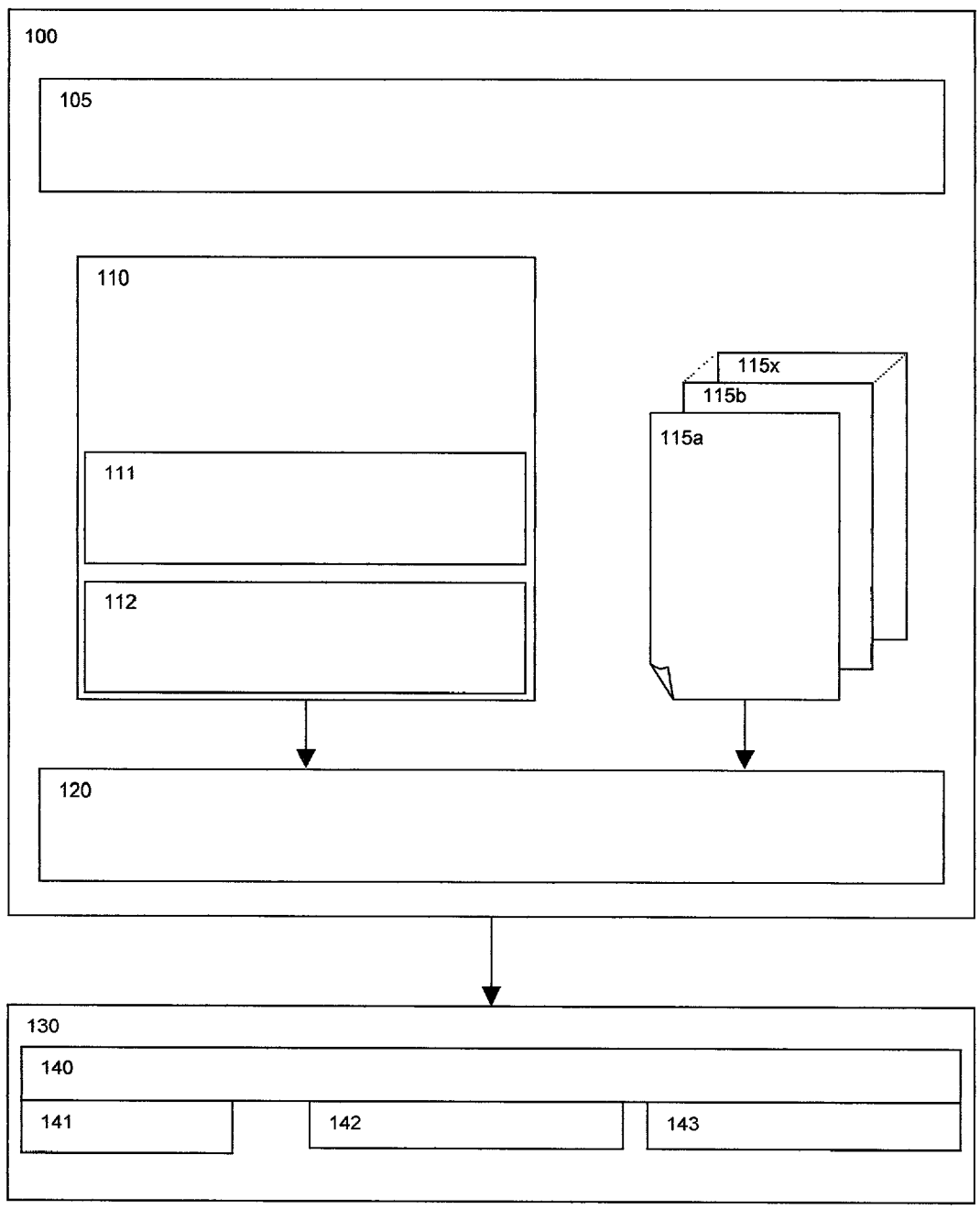
FIG. 1 is a block diagram of an XML client abstraction layer according to an embodiment of the present invention.

Referring to FIG. 1, an XML client abstraction layer 100 for use in design time is shown. The XML client abstraction layer 100 contains a definition layer 105 that defines the syntax used in XML client abstraction layer 100 and sets the parameters for the XML that is permitted to be used. Definition layer 105 is described in more detail hereinafter with reference to FIG. 2.

XML client abstraction layer 100 also includes integration logic XSLT 110. Integration logic XSLT 110 defines the translation rules for translating XML templates. Because XSLT has a very thorough syntax check, a syntax error is returned if inappropriate syntax is generated. This minimizes the occurrence of errors that would crash an application during runtime.

Integration logic XSLT 110 includes client specific logic 111 and middleware specific logic 112. Client specific logic 111 is responsible for abstracting the client on which the web-based applications will be used from the XML. Client specific logic ill may be, for example, a client-side framework as is discussed herein with respect to FIG. 3. Middleware specific logic 112 is responsible for abstracting the middleware on which the web-based applications will be used from the XML.

Templates 115 a–x are present. These are XML templates.

An XML Parser 120 is present as well. It is utilized to publish applications to the middleware 130 for use during runtime. Changes to templates such as new features or improvements can be added through this layer.

Middleware 130 contains template folders 140 for storing the published templates and application servers 141, 142 and 143. A number of applications servers may be supported. These may include Java application servers, other standards-based applications servers and/or proprietary application servers.

Figure 2:
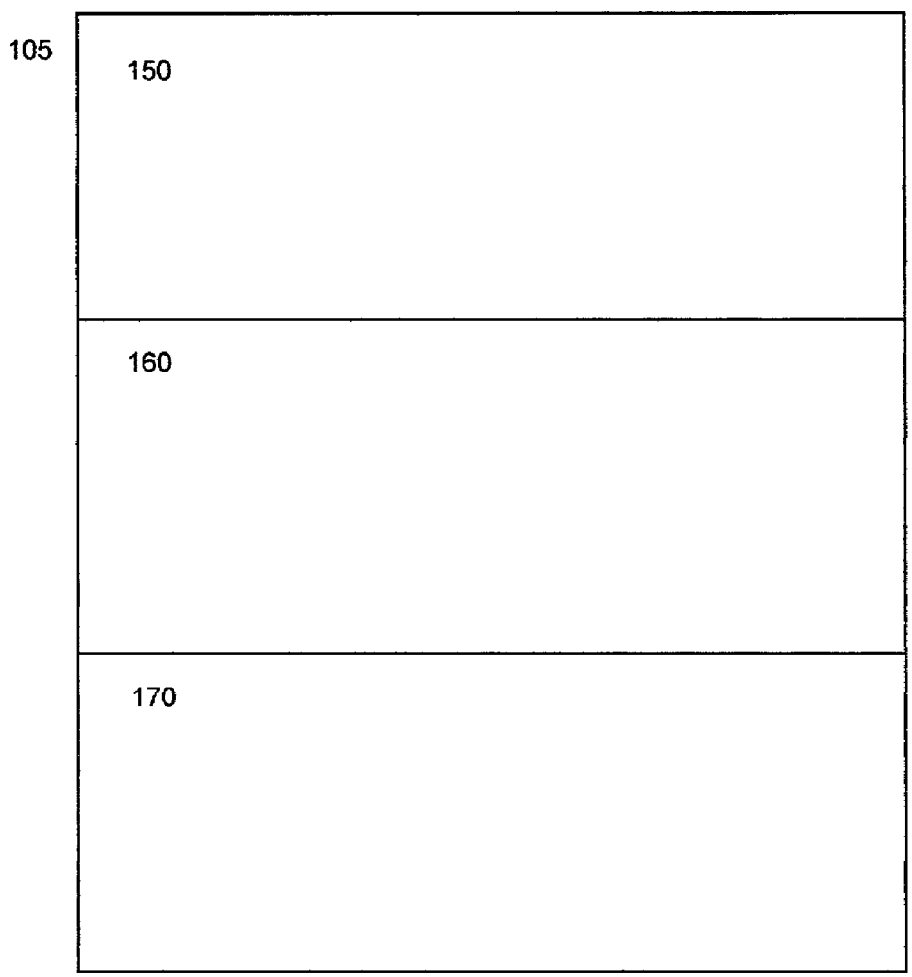
FIG. 2 is a block diagram of a definition layer defining syntax for an XML client abstraction layer according to an embodiment of the present invention.

FIG. 2 depicts the details of definition layer 105. Definition layer 105 has three major functionalities. Functionality 150 is the interface functionality. Interface functionality 150 defines data containers sent to web servers 141, 142 and 143. It also defines screen-to-screen communications, parameters and GUI components.

Event functionality 160 handles XML client abstraction layer application events, such as getDetail. Event section 160 is triggered by HTML events, such as onClick. It also provides for manipulation of GUI components, such as set/read values, and interfaces, such as sent/set parameter.

View functionality 170 defines the layout of the HTML page. It provides different views for different user profiles and different layout types. View functionality 170 uses user interface components including layout components, such as group box, and input components, such as input fields.

Figure 3:
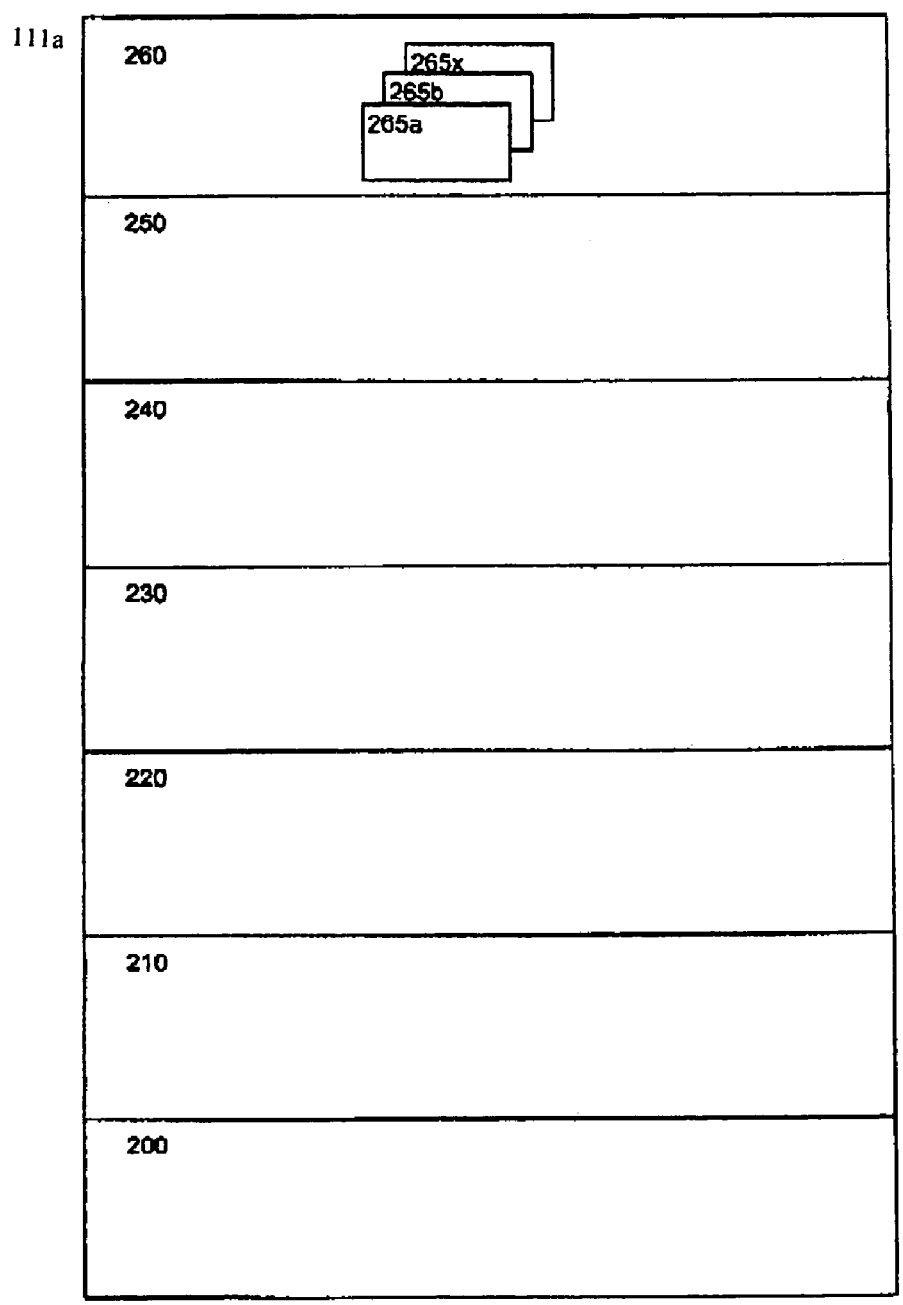
FIG. 3 is a block diagram of a client-side framework for an XML client abstraction layer according to an embodiment of the present invention.

Referring now to FIG. 3, a client-side framework according to an embodiment of the present invention is now described. The client-side framework offers special functionality that can add features to pages. One such feature is a means for communication between pages. This is especially helpful when a user may have multiple web pages open.

The client-side framework may be implemented using client-side languages such as JavaScript, VBScript, etc. Preferably, JavaScript is used.

In order to provide such a framework, the client-side language can be enhanced to provide object-oriented features, such as inheritance. Also, a library is provided for developers, so they do not need to do any actual client-side language programming (for instance, JavaScript).

The client-specific logic layer 111 may comprise a client-side framework 111a. Client-side framework 111a is comprised of a number of layers and provides for event control, session management, dynamic loading of content, controlling and monitoring of user input, click stream analysis, device locking, remote control, runtime debugging and client-sided event recording.

The first layer of client-side framework 111a is client-side object layer 200. This layer is a new language derived from the client-side language (for instance, JavaScript) that permits the use of object-oriented techniques, so that methods and attributes can be transported from one class to another. These techniques include the declaration of classes; the declaration of attributes and methods within a class; the instancing of objects according to a class declaration; constructor declaration; multiple inheritance; polymorphing, including the overriding and overloading of methods; helper functions such as "instanceOf" and "marshall" for object serialization; and unrestricted access to super classes and their attributes and methods. The objects demonstrate identical behavior in their functionality, independent of the browser version.

Client-side object layer 200 provides reusability, maintenance and extensibility. The technique requires the properties and methods declaration be run through only once. This provides a significant performance advantage. It means that object properties and methods are linked only once, that is when the first instance of the class is instanced.

The second layer of client-side framework 111a is object pool layer 210. Because the various client-side objects from individual windows and frames are isolated units, problems exist with object assignment and intercommunication. Object pool layer 210 is provided in order to address these problems. Object pool layer 210 encapsulates all the objects in a common object framework so that they all have the same structure because the structure of the objects within the pool is critical to proper intercommunication. Thus, object pool layer 210 effectively breaks the borders between frames and windows.

The third layer of client-side framework 111a is linking layer 220 and handles linking of HTML objects. HTML objects have restricted functionality. Client-side language functions are frequently used to supplement this functionality. However, there is no direct relationship between an HTML object and a specific client-side language instance that determines the behavior of the individual HTML object.

Linking layer 220 links the HTML object to a client-side language object. This is a one-to-one coupling. The properties of the client-side language object determine the behavior of the HTML object. The HTML object and the client-side language object reference each other and share their functionality. Intercommunication occurs by way of this referencing. Using layers 200 and 210, one can then include HTML objects in the object pool.

By providing linking layer 220, a programmer no longer needs to bind functions to HTML. Instead, the objects are bound. For instance, an object may have a method, "validate", that now permits validation of the HTML input data. This layer provides more flexibility since some things were not possible through ordinary binding functions.

The fourth layer of client-side framework 111a is communication layer 230. This layer is provided in order to allow the objects to communicate with each other and to enable access from outside the object pool. This layer utilizes an event concept to provide communication. Browser-specific events are converted by this layer to event objects of the object pool (for example, user command "keypress" of an input field). An additional listener concept is added to the event model, for example, by delegation. Communication layer 230 generates event objects within the framework and sends events to those objects that need the events. Some properties of Java are present, such as event listening by delegation.

Management layer 240 is the fifth layer of client-side framework 111a. When a page in a browser is replaced by another page, its contents and their client-side language data/objects are normally lost. Thus, there should be a persistent data storage facility. Techniques to enable access to cross-object data and actions both from within and outside the object pool and also to enable these actions and data to be managed are included in management layer 240.

This layer contains a central instance object that coordinates management, including communication, window management, session management, object management and cloning of objects.

This central instance continues to exist beyond the lifetime of the frames and windows in object pool 210 and assumes a central function. It coordinates and manages the individual objects and their actions when this is necessary. It also provides central functionality. For example, saving and management of persistent data, windows management, management of the objects themselves, communication management and session management.

In order to store data/objects from a frame persistently in another frame, a cloning technique is utilized. This would duplicate the data and objects in such a way that the instance of the data/objects would be in the target frame. To enable the above, each object requires a method that first performs the cloning specific to that object and second, whenever an additional object is linked by "Has-a-Relation", for example, it calls up that object's cloning method.

An alternative solution for retaining persistent data is that the data/objects for a frame/window would be generated in a central instance and the reference to the related frame/window would be defined.

The sixth layer of the framework is pool-wide tool layer 250. Because of the introduction of the various layers described herein, pool-wide tool layer 250 is useful to simplify programming work.

Tools that could be included are development support tools, such as a tracer and a debugger; a tool that can record and playback user interactions; a tool permitting remote control of other browser instances; a remote debugger; a tool that can be used during runtime to look at the properties of the object pool or of the individual objects, and with which you can also call up the methods of such objects; and others.

The seventh layer of client-side framework 111a is application layer 260. This layer includes web applications that use the functionality of the object pool. It can provide applications with special objects using possibilities provided by the framework.

Screen interfaces 265 a–x are similar to HTML forms in that they are data containers. They generate a web server request that may lead to a response that causes the replacement of the current page.

The data contained in screen interfaces 265 a–x may consist of data or objects that originate from different frames or windows. The data is collected just before the interface is triggered (e.g., before the request is generated). As the data is being collected, general operations can be carried out. For example, data can be validated. This validation either interrupts the process before the request in the event of inconsistent data or corrects the data itself. Data can also be added that is required across different applications or across a single application. This data is stored persistently and is added automatically to each relevant screen interface 265 a–x, so data does not have to be explicitly added each time.

Therefore, screen interfaces 265 a–x are the direct interfaces to the web applications. They feed data to the applications.

The information on exactly which application status is requested is contained in each screen interface 265 a–x and consists of a URL and application-specific HTTP Post/Get parameters. These destination parameters can also be encapsulated logically in a client-side language object and are then a unique reference to a particular application status.

Screen interfaces 265 a–x may have additional parameters. They may have a field that reflects state.

By utilizing the XML client abstraction layer of the present invention one can provide central change of user interface, central change of function library, central error handling, central management of browser dependencies, syntax and plausibility checks, tracing and debugging, lessening of training effort required, easily readable and understandable templates, device specific views, better performance, and increased stability.

Although the preferred embodiments of the present invention have been described and illustrated in detail, it will be evident to those skilled in the art that various modifications and changes may be made thereto without departing from the spirit and scope of the invention as set forth in the appended claims and equivalents thereof.

What is claimed is:

1. A system for designing software applications, the system comprising:
    a client abstraction layer for use in design time in developing a web-based software application, the web-based software application comprising one or more HTML pages, the client abstraction layer being an abstraction of a user interface for a software application, the client abstraction layer comprising:
    a definition layer, the definition layer defining XML that is permitted to be used in the system;
    a plurality of XML templates, the XML templates providing XML page descriptions as an abstraction of HTML pages at design time, the XML page descriptions being used to define layout information;
    an integration logic XSLT layer, said integration logic XSLT layer abstracting said plurality of XML templates, and comprising client specific logic and middleware specific logic, wherein:
        the client specific logic abstracts a client on which the web-based application will be used from the XML and the client specific logic comprises a client-side framework, said client-side framework providing object-oriented features to a client-side scripting language; and
        the middleware specific logic abstracts middleware on which the web-based application will be used from the XML; and
    an XML parser, the XML parser publishing applications for use during run time.

2. The system as in claim 1, wherein said definition layer comprises an interface section, said interface section defining data containers to be sent to a web server.

3. The system as in claim 2, wherein said interface section further defines screen-to-screen communications, parameters and GUI components.

4. The system as in claim 1, wherein said definition layer comprises an event section, said event section handling application events.

5. The system as in claim 4, wherein said event section is triggered by HTML events.

6. The system as in claim 4, wherein said event section provides for the manipulation of GUI components.

7. The system as in claim 1, wherein said definition layer comprises a view section, said view section defining a layout of an HTML page.

8. The system as in claim 7, wherein said view section provides a plurality of views, said plurality of views being based upon a plurality of user profiles.

9. The system as in claim 7, wherein said view section provides a plurality of layout types.

10. The system as in claim 7, wherein said view section utilizes UI components.

11. The system as in claim 1, wherein said client-side language is JavaScript or VBScript.

12. The system as in claim 1, said client-side framework comprising a client-side object layer, the client-side object layer being a new language derived from the client-side language permitting the use of object-oriented techniques, the techniques including a declaration of a class, a declaration of an attributes or a method within the class, and instancing of an object according to the class declaration.

13. The system as in claim 1, said client-side framework comprising an object pool layer, the object pool layer encapsulating a plurality of objects so that the objects have the same structure and the objects can intercommunicate.

14. The system as in claim 13, said client-side framework comprising a application layer, the application layer comprising a web application using the objects in the object pool layer.

15. The system as in claim 1, said client-side framework comprising a linking layer, the linking layer coupling a plurality of HTML objects on a one-to-one basis with a plurality of client-side language objects, so that the properties of the client-side language objects determine the behavior of the HTML objects.

16. The system as in claim 1, said client-side framework comprising a communication layer, the communication layer allowing a plurality of objects to communicate with each other.

17. The system as in claim 1, said client-side framework comprising a management layer, the management layer allowing client-side language objects to persist across a browser refresh.

18. The system as in claim 1, said client-side framework comprising a pool-wide tool layer, the pool-wide tool layer comprising development support tools including a debugger.

* * * * *